(12) United States Patent
Higgins

(10) Patent No.: US 6,785,623 B2
(45) Date of Patent: Aug. 31, 2004

(54) BUSINESS TO BUSINESS ELECTRONIC TEST MONITORING INFORMATION SYSTEM

(75) Inventor: Robert C. Higgins, Tiverton, RI (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 13 days.

(21) Appl. No.: 10/244,925

(22) Filed: Sep. 11, 2002

(65) Prior Publication Data
US 2004/0049360 A1 Mar. 11, 2004

(51) Int. Cl.⁷ .......................... G01N 37/00; G06F 19/00
(52) U.S. Cl. .............. 702/81; 702/35; 702/82; 702/83; 702/84; 700/91; 700/110; 714/38; 705/3; 705/11; 705/28; 379/15.01; 379/114; 235/375
(58) Field of Search ................ 702/35, 81–84; 700/91, 110; 714/38; 705/3, 11, 28; 379/15.01, 114; 235/375

(56) References Cited

U.S. PATENT DOCUMENTS

| | | | | |
|---|---|---|---|---|
| 6,314,379 B1 | * | 11/2001 | Hu et al. | 702/81 |
| 6,353,767 B1 | * | 3/2002 | Wakeman et al. | 700/91 |
| 6,408,219 B2 | * | 6/2002 | Lamey et al. | 700/110 |
| 2003/0065978 A1 | * | 4/2003 | Adams | 714/38 |
| 2003/0097315 A1 | * | 5/2003 | Guerrero et al. | 705/28 |
| 2003/0158795 A1 | * | 8/2003 | Markham et al. | 705/28 |

* cited by examiner

*Primary Examiner*—John Barlow
*Assistant Examiner*—Aditya S Bhat
(74) *Attorney, Agent, or Firm*—James M. Kasischke; Michael F. Oglo; Jean-Paul A. Nasser

(57) ABSTRACT

A system/method of establishing a two-way communication system between a testing/manufacturing site and a component vendor is disclosed. The system allows the test results related to a component failure to be immediately available to a vendor by allowing the vendor password protected access to a product database that contains information regarding the product being tested. The system automatically alerts the vendor associated with the defective component, and allows the vendor to download the vendor's failure analysis report to the product database as soon as it becomes available. Upon receipt of the vendor's failure analysis report, the appropriate testing/manufacturing personnel are notified.

18 Claims, 3 Drawing Sheets

BUSINESS TO BUSINESS ELECTRONIC TEST MONITORING INFORMATION SYSTEM

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION (1) Field of the Invention

The invention relates to systems for monitoring testing/manufacturing processes and, more particularly, to such systems which identify defective components and their corresponding vendors.

(2) Description of the Prior Art

There are many known systems for monitoring testing and manufacturing processes. Such systems are typically computerized and vary in their level of integration into the testing/manufacturing process. Some systems provide the capability to monitor and report the number of parts produced and defects or faults. This information has proven useful in evaluating and improving or controlling testing/manufacturing processes.

However, known systems do not offer an automated two-way system for communication between product manufacturer and a vendor component manufacturer. For example, often a manufacturing company will produce a product with multiple component parts that are manufactured by other companies or vendors. When the ultimate product is manufactured and tested, a component of the ultimate product will fail. Testing is done on the defective product to determine which component failed and ultimately the vendor is asked to produce a failure analysis wherein the ultimate cause of the failure is analyzed. However, the inability to provide the component vendor with prompt and sufficient information regarding testing procedures, tolerance criteria, testing history, etc. often results in long delays. Moreover, known systems do not provide a method of notifying the product manufacturer of the availability of the component vendor failure report.

SUMMARY OF THE INVENTION

A first object of this invention is a system that reduces delays in the testing/manufacturing process.

Another object is a system that automatically alerts the associated vendor upon a component failure or defect.

A further object is a system that allows the vendor access to all relevant and/or necessary information regarding the component failure and testing.

Yet another object is a system that allows the component vendor to enter data regarding the cause of the component failure.

As a final object, the system should automatically alert the appropriate testing/manufacturing personnel of the availability of the vendor's failure analysis.

Accordingly, the present invention features a system and method of monitoring business-to-business product testing by establishing a two-way communication system. In one embodiment, the system stores information associated with a product in a database. Upon detection of a defect, the system identifies the vendor associated with a defective component of the product and automatically notifies predetermined personnel within the manufacturing/testing organization and at least the vendor associated with the defective component. Next, the system provides access to the database to at least the vendor, thus allowing the vendor to obtain information regarding the defect. The vender then downloads information regarding the defect into the database, at which point predetermined personnel within the testing/manufacturing organization are automatically notified. Access to the vendor's product failure analysis report is then provided to the predetermined personnel.

In a preferred embodiment, the database is a product database and includes component-vendor data, product testing procedure data, acceptance criteria data, and component failure history data. The access given to the vendor is preferably password protected.

BRIEF DESCRIPTION OF THE DRAWINGS

These and other features and advantages of the present invention will be better understood in view of the following description of the invention taken together with the drawings wherein.

DESCRIPTION OF THE PREFERRED EMBODIMENT

Figure 1:
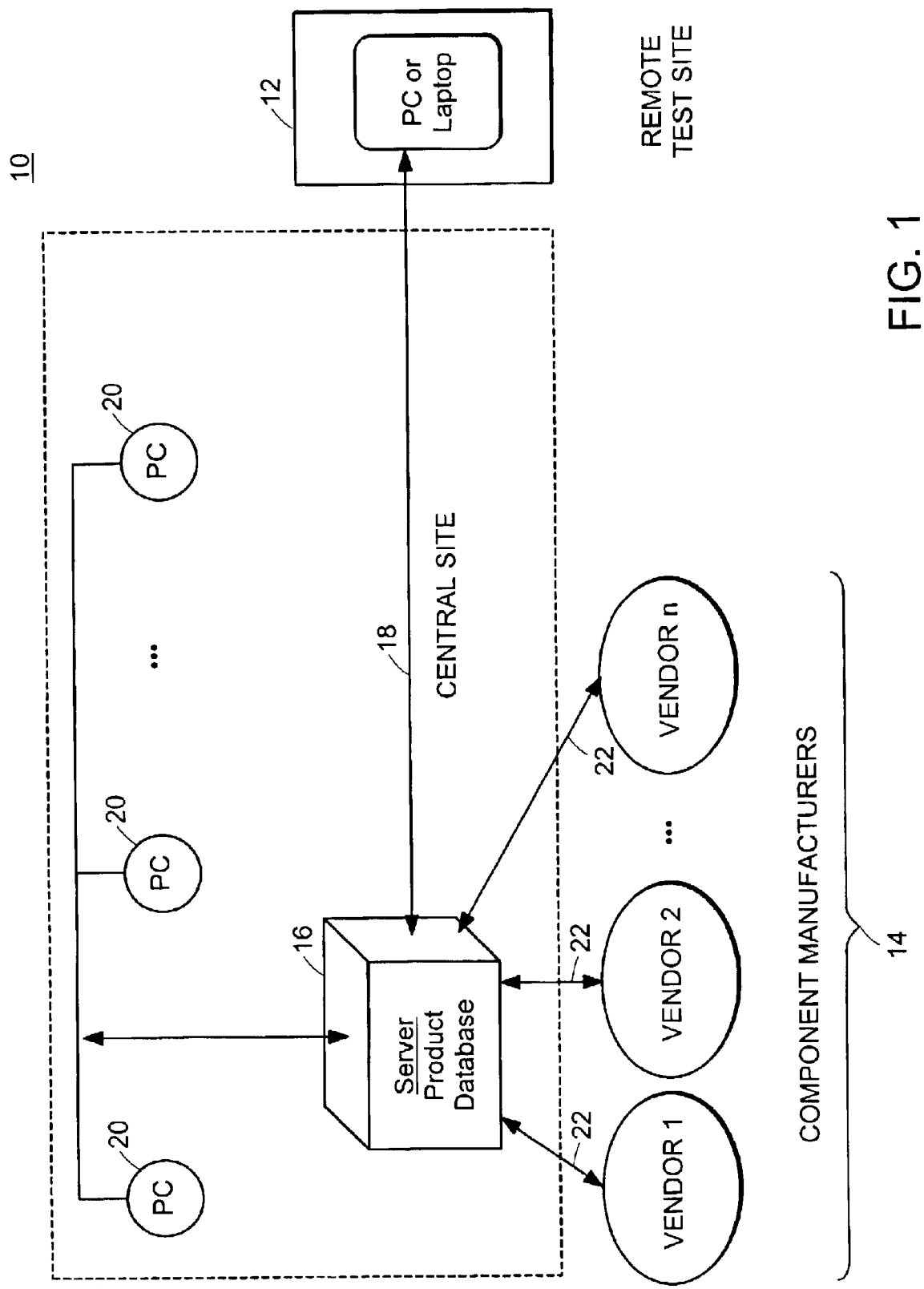
FIG. 1 is a block diagram of one embodiment of a network structure of the present invention.

A system 10, FIG. 1, in accordance with the present invention, monitors the testing/manufacturing process conducted at site 12, for instance a remote testing/manufacturing site, of a product that contains components from a plurality of vendors or component manufacturers 14. The system 10 automatically creates a two-way communication system between the remote testing/manufacturing site 12 and the component vendors 14 upon the identification of a defect in the product by automatically notifying and providing access to a database 16 to both the component vendor 14 and the testing/manufacturing site 12. As a result, delays in the testing/manufacturing process are thereby reduced.

The remote testing/manufacturing sites 12 represent manufacturing stations, testing stations, and/or quality assurance stations, and typically include a computer that is linked to the database 16 through a network connection 18. The database 16 may also be linked to a plurality of other stations 20 located anywhere within the testing/manufacturing organization. Additionally, the system 10 includes a network connection 22 between the plurality of vendors 14 and the database 16.

The database 16 includes relevant information (data) regarding the product being tested/manufactured. In a preferred embodiment, the database 16 is product database, and may be any commercially available product database known to those skilled in the art. The system 10 can be used in conjunction with any other known systems that monitor testing/manufacturing processes.

Figure 2:
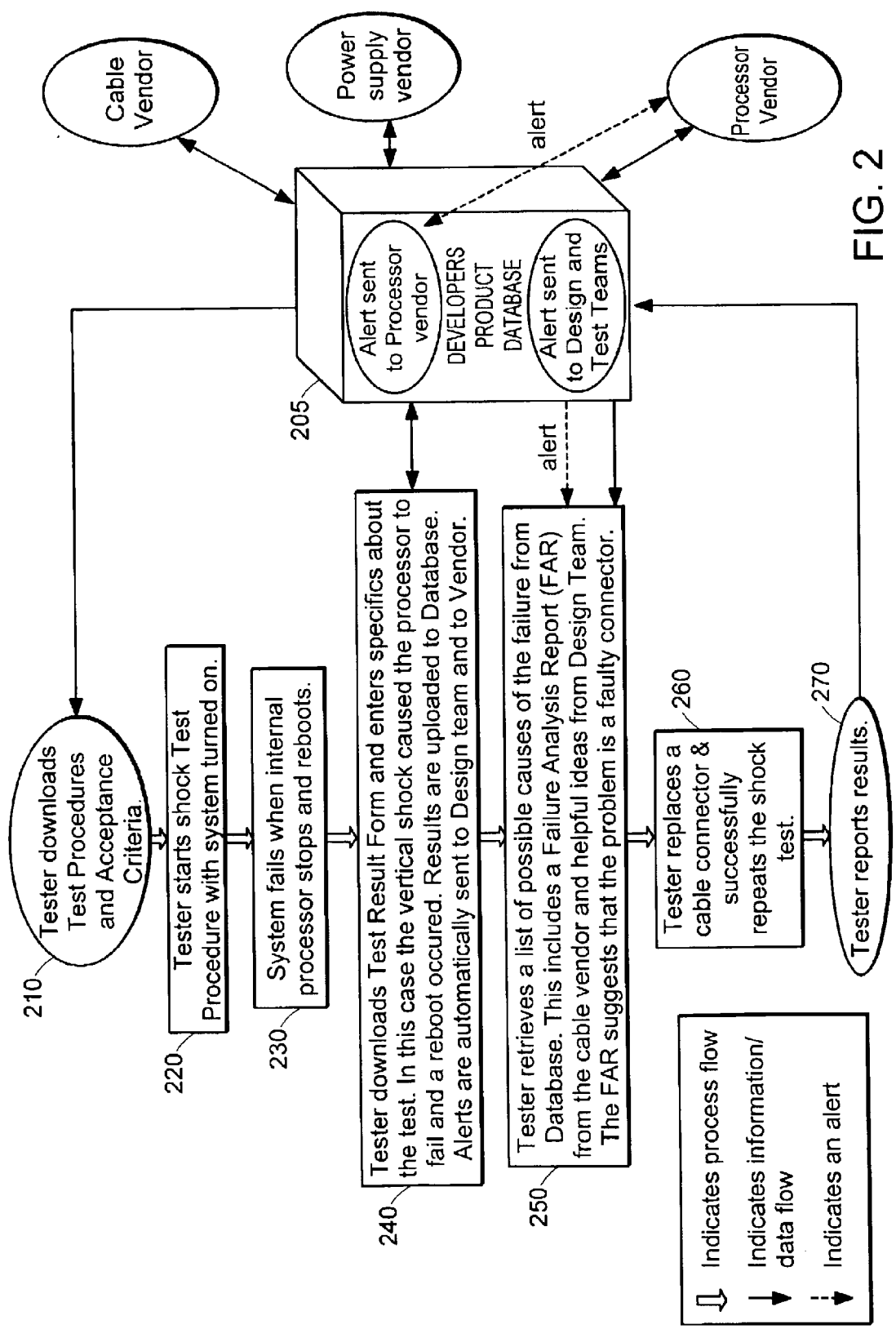
FIG. 2 is a block diagram illustrating the data flow between a product manufacturer and component vendors according to one embodiment of the present invention.

For simplicity, the present invention will be described as it relates to a computer system shock test, but this is for exemplary purposes only, and is not intended to be a limitation in any way. The following is best understood when read in conjunction with FIGS. 2 and 3.

In one embodiment, a tester, for example at a remote testing site, downloads 210 data associated with the testing of a product (such as a computer system) from the database 205. In a preferred embodiment, the database is a product database and includes test procedure data, acceptance criteria data, component-vendor data, component failure history data, and/or any other relevant data associated with the product.

The tester then performs the test 220, for example a system shock test. In the event that a defect in the product is detected (e.g., the processor stops and reboots 230), data regarding the product test is entered into the database. In one embodiment, the tester downloads a test result form 240 and enters specifics about the test including acceptance or failure. The test result form preferably includes a graphical user interface (GUI) that allows the tester to quickly and easily enter the data into the database. The test result form contains information relevant to the test performed and the exact format and/or information contained within it will depend upon the circumstances of the test, and is within the ordinary knowledge of one skilled in the art. The test result form will have a predetermined format that best suits the application. Upon completion of the form, results are uploaded to database 205, which follows the process shown in FIG. 3.

Figure 3:
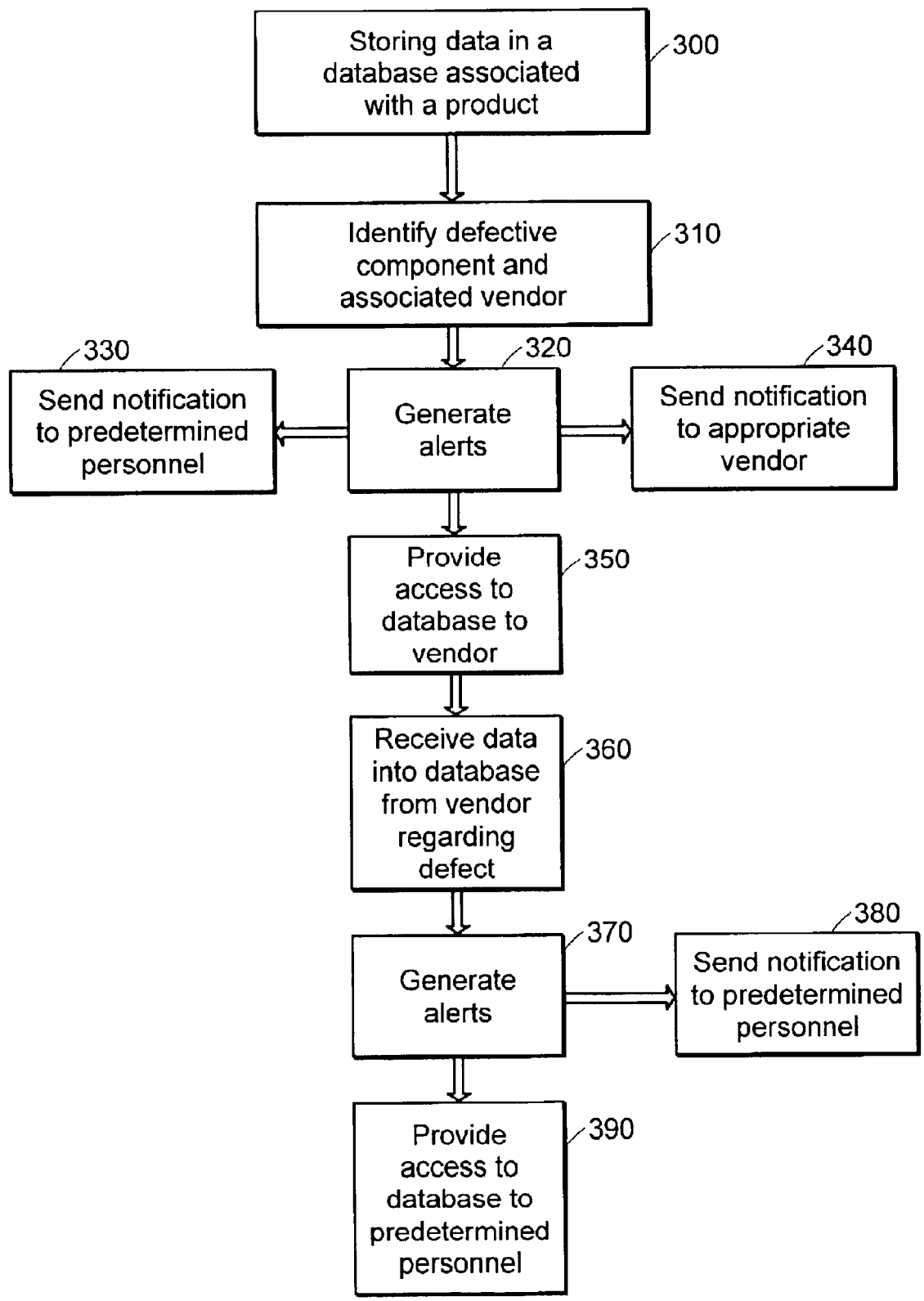
FIG. 3 is a flow chart that defines functions performed by one embodiment of the present invention.

Database 205 is initially provided with data about the products, FIG. 3, step 300. Upon entry of a failed test result form, the component responsible for the product failure and the vendor associated with the corresponding defective component are identified 310. In a preferred embodiment, the present invention automatically identifies the component vendor associated with the component failure. Upon identification of the occurrence of the defect, alerts are generated 320 and sent to predetermined personnel 330 within the testing/manufacturing organization and at least the vendor 340 associated with the component failure. Alerts may also be sent to additional parties including, but not limited to, other vendors associated with the product. The alerts include any method known to those skilled in the art including, but not limited to, e-mail notification, telephonic notification, and paging.

Upon receipt of the alert, access 350 to the product database is provided to at least the vendor associated with the defect. Additional parties may also be granted access as deemed necessary. The extent of the access granted to the vendor and others will depend upon the particular circumstances, but generally includes access to the data within the product database that is necessary to determine the cause of the failure. In a preferred embodiment, the access to the product database is password protected.

After determining the cause of the failure, the vendor then transmits information 360 related to the component failure along with any additional information/comments. In a preferred embodiment, the vendor downloads a Failure Analysis Report (FAR) from the database and transmits the completed FAR to the database. The information contained in the FAR will depend upon the particular test performed. In an exemplary embodiment, the FAR may include raw test data, interpretation of data collected, and a conclusion derived from experience and knowledge.

Upon receipt of the information from the vendor regarding the vendor's analysis of the component failure, generated analysis alerts 370 are automatically sent to predetermined personnel 380 within the testing/manufacturing organization notifying them of the information's availability. Availability of this information is shown in step 250. The predetermined personnel may include the same or different personnel who received the original notification. Again, alerts may also be sent to additional parties including, but not limited to, other vendors associated with the product and may include any method known to those skilled in the art including, but not limited to, e-mail notification, telephonic notification, and paging. Access 390 to the database is then made available to the predetermined personnel. These personnel can then take corrective action as shown at step 260.

The recommendations of the vendor, along with those within the organization, are then retested and the results entered 270 into the database. If another defect is identified, then the process starts all over again. Accordingly, the present invention reduces delays in the testing/manufacturing process.

In light of the above, it is therefore understood that within the scope of the appended claims, the invention may be practiced otherwise than as specifically described.

What is claimed is:

1. A method of monitoring product testing comprising the steps of:
    storing data in a database associated with said product;
    receiving data indicating an occurrence of a defect into said database;
    identifying a defective component associated with said defect;
    identifying a vendor associated with said defective component;
    notifying predetermined personnel of said defect;
    notifying at least said vendor associated with said defective component;
    providing access to said database to at least said vendor, wherein said access to said database provided to said vendor associated with said defective component is password protected;
    receiving and storing vendor data from said vendor associated with said defective component regarding said defect in said database;
    notifying said predetermined personnel of said vendor data from said vendor; and
    providing access to said stored vendor data from said vendor to said predetermined personnel.

2. The method as claimed in claim 1 wherein said database is a product database.

3. The method as claimed in claim 2 wherein said product database comprises component-vendor data, product testing procedure data, acceptance criteria data, and component failure history data.

4. The method as claimed in claim 3 wherein said product database further comprises data regarding corrective actions taken in response to said defect.

5. The method as claimed in claim 1 wherein said act of providing access to said database to said vendor associated with said defective component includes access through the world wide web.

6. The method as claimed in claim 1 wherein said act of providing access to said database to said vendor associated with said defective component includes access through a network.

7. The method as claimed in claim 1 wherein said acts of notification of said predetermined personnel and said vendor associated with said defective component include sending an e-mail message to at least one predetermined recipient according to said database.

8. The method as claimed in claim 1 wherein said acts of notification of said predetermined personnel and said vendor associated with said defective component include electronically paging at least one predetermined recipient according to said database.

9. The method as claimed in claim 1 wherein said acts of notification of said predetermined personnel and said vendor associated with said defective component include telephoning at least one predetermined recipient according to said database.

10. The method as claimed in claim 1 wherein said date received and stored from said vendor associated with said defective component includes a product failure analysis report.

11. The method as claimed in claim 1 further including prompting a user to enter said data indicating said occurrence of said defect into said database.

12. The method as claimed in claim 11 wherein said prompting includes use of a graphical user interface.

13. A method of monitoring product testing comprising the acts of:

storing data in a product database, said data comprising component-vendor data, product testing procedure data, acceptance criteria data, and component failure history data;

receiving testing data indicating an occurrence of a defect into said database;

identifying a vendor associated with said defect;

notifying predetermined personnel of said defect;

notifying at least said vendor of said defect;

providing access to said product database to at least said vendor wherein said access provided to said product database is password protected;

receiving a failure analysis report from said vendor into said product database;

notifying said predetermined personnel of said failure analysis report; and providing access to said failure analysis report to said predetermined personnel.

14. The method as claimed in claim 13 further comprising the step of entering corrective action data into said product database, said product database further comprising data regarding corrective actions taken in response to said defect.

15. The method as claimed in claim 13 wherein said step of providing access to said product database to said vendor includes access through a network.

16. The method as claimed in claim 13 wherein said steps of notification include sending an e-mail message to at least one predetermined recipient according to said product database.

17. The method as claimed in claim 13 wherein said steps of notification include electronically paging at least one predetermined recipient according to said product database.

18. The method as claimed in claim 13 wherein said acts of notification include telephoning at least one predetermined recipient according to said product database.

\* \* \* \* \*